April 26, 1949.    C. J. COPPOLA    2,468,616
CUP FORMING MACHINE

Filed May 2, 1947    2 Sheets-Sheet 1

INVENTOR
*Charles J. Coppola*
BY
*Pennie Edwards, Morton & Barrows*
ATTORNEYS

April 26, 1949.  C. J. COPPOLA  2,468,616
CUP FORMING MACHINE
Filed May 2, 1947  2 Sheets-Sheet 2
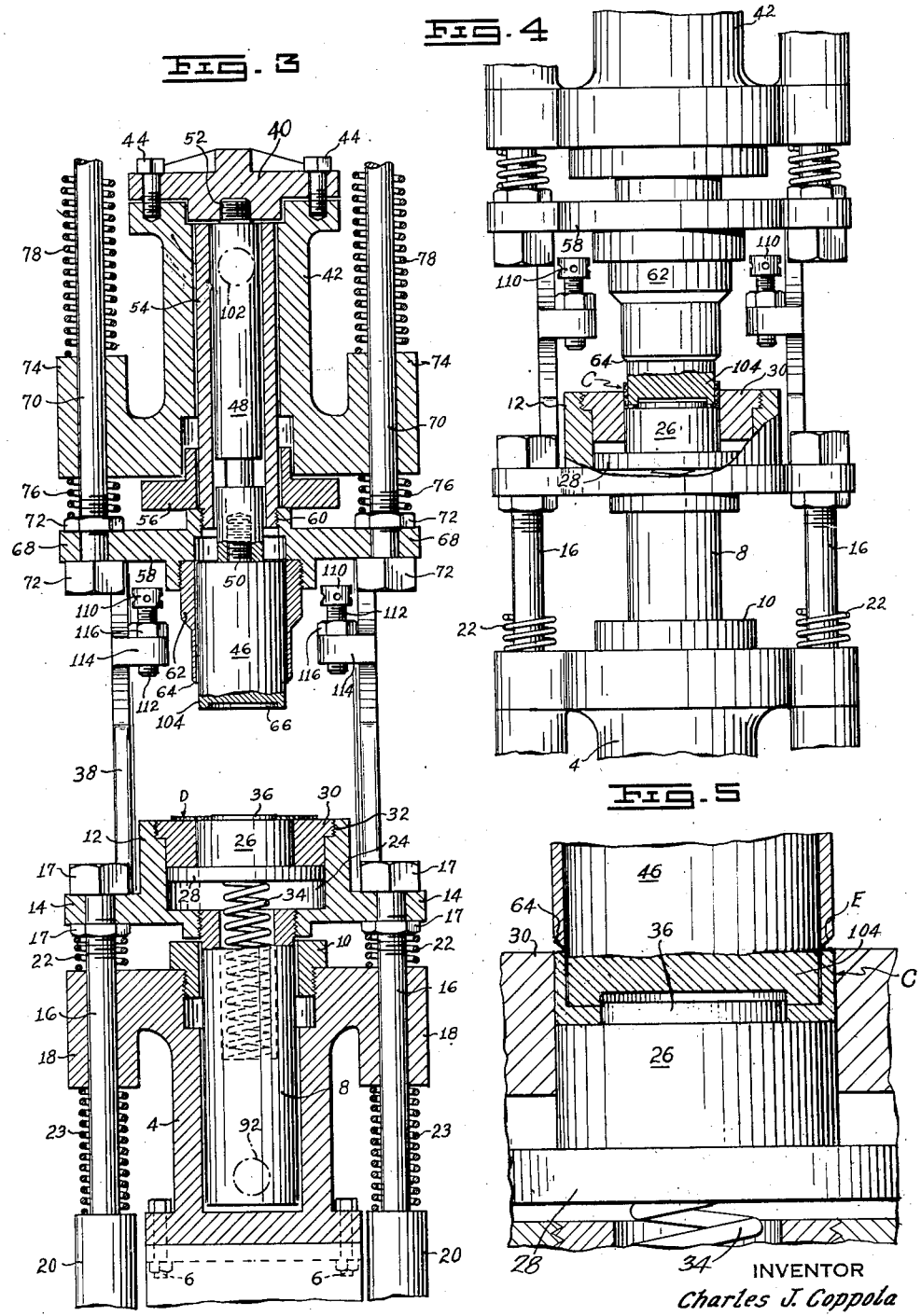
INVENTOR
Charles J. Coppola
BY
Paine, Edmonds, Morton & Barrows
ATTORNEYS Patented Apr. 26, 1949

2,468,616

UNITED STATES PATENT OFFICE 2,468,616

CUP FORMING MACHINE

Charles J. Coppola, New York, N. Y., assignor to Chas. A. Schieren Company, New York, N. Y., a corporation of New York Application May 2, 1947, Serial No. 745,671

5 Claims. (Cl. 69—8)

This invention relates to apparatus for forming leather cups, and more particularly to a machine in which a disc of leather is shaped to form a packing cup.

The machine forming the subject matter of the invention consists essentially of upper and lower die members, operated by suitable means, such as air pressure, between which a leather disc is placed and shaped to form the bottom and flange of a leather packing cup.

An object of the invention is to provide a machine of this character in which all of the working parts are contained in the upper and lower cylinders. A machine so built can be more efficiently operated than similar machines heretofore available and the output of such a machine is greater.

A further object of the invention is to provide a machine of this character in which separate control valves are provided for the upper and lower cylinders. Such construction is more sensitive to the various thicknesses and consistencies of leather than a machine in which a single control valve is provided. It can compensate for variance in leather by operating the top cylinder to allow for such variance. Frequently, due to the stretching characteristics of leather, the cups will vary in height and this can be compensated for by increasing the pressure in the upper cylinder.

A further object of the invention is the provision of a machine for molding cups with or without an opening in the bottom of the cup. Machines heretofore employed for this purpose were incapable of molding a disc having a central opening and thus, when cups having a central opening were desired, as is most often true, it was necessary to form the opening in the finished cup by a separate operation.

In the accompanying drawings I have shown one embodiment of the invention. In this showing:

Fig. 3 is a vertical, sectional view on line 3—3 of Fig. 2;

Fig. 4 is a view in the same plane as Fig. 3 showing the position of the parts when the lower die has moved upwardly and engaged the upper die;

Fig. 5 is a similar view showing the parts in the next step in the sequence of operation;

Figure 1:
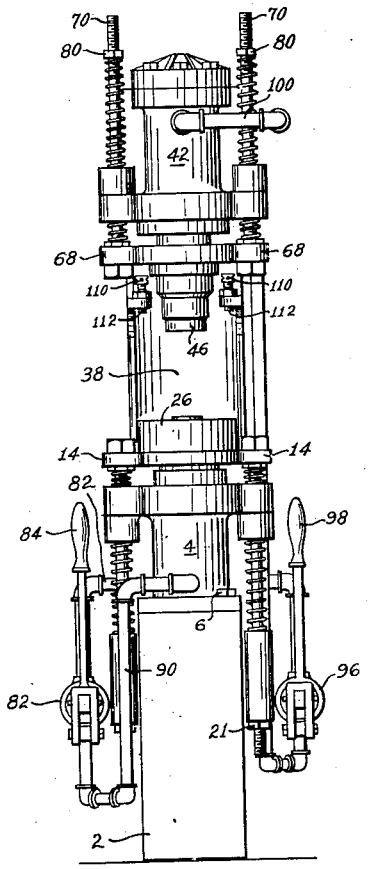
Fig. 1 is a front elevation of the machine.
Figure 2:
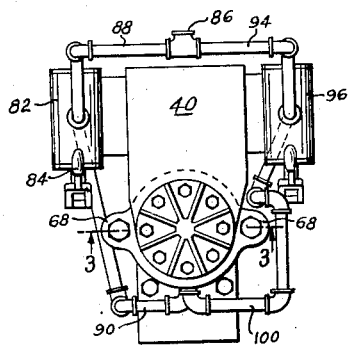
Fig. 2 is a plan view.

Referring to the drawings, the reference numeral 2 represents the base of the machine on which the lower cylinder 4 is mounted. The cylinder may be secured to the base in any suitable manner as by bolts 6 (see Fig. 3). A piston 8 is mounted in the cylinder, the piston passing through a suitable packing gland 10 in the upper end of the cylinder and carrying the lower die support 12. The die support is provided with tubular extensions or sleeves 14 at each side adapted to receive guide rods 16. The guide rods are secured to the sleeves by nuts 17. These guide rods pass through guides 18 carried by the cylinder block. Beyond the guides 18 the rods carry sleeves 20, which are retained on the lower ends of the rods by nuts 21 (see Fig. 1). Coil springs 22 surround the guide rods between sleeves 14 and guides 18. Similar coil springs 23 surround the rods below the guides 18, and are received in sleeves 20. Engagement of sleeves 20 with the lower face of guides 18 limits the upper movement of the lower die support.

The upper side of the die support is provided with a recess 24 and this recess receives the die 26. As shown, the die is provided with a flange 28 at its lower end and is held in the die support by a retaining ring 30. The retaining ring is provided with external screw threads adapted to engage the internal threads in the recess 24 as shown at 32. The die 26 is thus capable of movement in the recess but its outward movement is limited by the flange 28. It is normally retained in the outer position by a coil spring 34 which engages the bottom of the die and is received in a recess in the piston 8. The die is also provided with a projection 36 on its upper surface of a diameter equal to the opening in leather disc and of a thickness substantially equal to the thickness of the leather.

The upper die structure is supported from the frame 38 of the machine by an upper supporting plate 40 to which the upper cylinder 42 is secured by bolts 44. A die member 46 is connected to a central supporting member 48 arranged in cylinder 42 by threaded connection 50 and the supporting member 48 is threaded into the upper supporting plate 40, as indicated at 52. Surrounding the member 48 within the cylinder 42 is a sleeve piston 54. The lower end of the piston extends through a packing gland 56 in the end of the cylinder and a movable die support 58 is secured thereto, as by threads 60. The movable support 58 carries a sleeve-like die member 62 which surrounds the stationary die 46. The lower end of the sleeve die is beveled as at 64 and the lower end of the stationary die member is provided with a recess 66 to receive the projection 36 on the upper face of the lower die member. The movable die support 58 is provided with extensions 68 at each side and guide rods 70 are passed through openings in these extensions and held in place by nuts 72. The cylinder 42 is provided with guides 74 having openings for the passage of the guide rods 70. Coil springs 76 and 78 are arranged above and below the guides 74. The springs 78 are retained on the rods above the guides by nuts 80 (see Fig. 1).

Downward movement of upper die support 58 and die 62 is limited by stops 110. As shown, the stops are carried by threaded members 112 to permit adjustment of the amount of travel of the die. These members are mounted in brackets 114 carried by the frame of the machine, and are retained in adjusted position by lock nuts 116.

Suitable means are provided for delivering fluid, such as air, under pressure to the upper and lower cylinders. As shown, a valve 82 controls the flow of air to the lower cylinder, and the exhaust therefrom, and this valve is operated by a suitable operating handle 84. Air is delivered from a suitable source indicated at 86 to the valve 82 through a pipe 88 and from the valve the air is conveyed through a pipe 90 to the air inlet 92 adjacent the bottom of the cylinder. A second branch pipe 94 extends from the source 86 to a valve 96 which controls the flow of air to the upper cylinder. This valve is provided with a suitable operating handle 98. From the valve a pipe 100 extends to inlet 102 of the upper cylinder.

Figure 6:
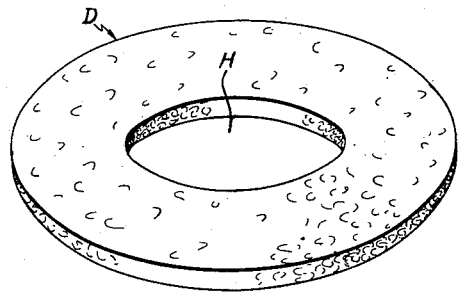
Fig. 6 is a perspective view of one of the discs prior to molding.
Figure 7:
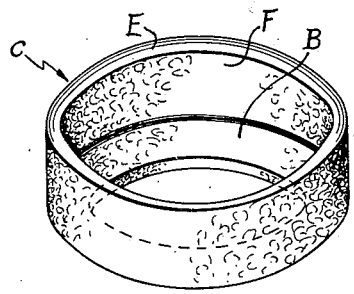
Fig. 7 is a similar view of the finished cup.

The leather disc, from which the cup is made, is shown in Fig. 6 of the drawings consisting of a disc D of a diameter to produce a packing cup of the desired size and provided with a central opening H, if the packing cup is to have an opening to permit it to be arranged on a pump rod or the like. The packing cup is shown in Fig. 7 of the drawings and designated generally by the letter C. It consists of a flange F and a bottom B. The upper edge of the flange is beveled as at E, as is the usual practice in the construction of such packing cups. The inner face of the flange F may also be knurled by providing suitable knurling on the lower portion 104 of the stationary upper die member 46.

The method of forming the packing cups will be apparent from the foregoing description. The die members 26, 46 and 62 are replaceable to permit the proper die members to be used for the size and type of packing cup to be made. Thus, the lower die member can be removed by first removing the retaining ring 30 and replaced by a die member of another size. Likewise, the upper die member can be removed by unscrewing it from the supporting member at 50. The sleeve die may be replaced by removing the support 58 and the sleeve die and substituting a sleeve die of the proper size together with a support having an opening of the proper size to receive the sleeve die. In making a packing cup with a central opening, a lower die is employed having a projection 36 of the same size as the central opening in the disc and in the finished cup and the upper die member 46 is provided with a corresponding recess or depression 66. When a packing cup is to be made without a central opening, a lower die member is used which has a flat upper surface and an upper die member 46 is also used having a flat lower face.

With the parts in the position shown in Fig. 1 of the drawings, the disc D is placed on the lower die member, valve 84 opened to deliver air to the lower cylinder 4. The die support 12 is raised, bringing the lower die in contact with the upper stationary die 46, as indicated in Fig. 4 of the drawings, and further movement of the lower die support causes the lower die member to move inwardly in the support against the compression of coil spring 34, thus shaping the outer portion of the disc between the retaining ring 30 and the side of the upper die member to form the flange F of the cup. During this movement, the springs 23 are placed under compression and cushion the movement of the die support and die. When the lower die member has moved upwardly to the position shown in Fig. 4 of the drawings and the leather forming the flange F of the cup is substantially entirely within the retaining ring, the valve 96 is opened to deliver air to the upper cylinder 42. This moves the sleeve die member 62 downwardly bringing its beveled lower edge 64 into contact with the edge of the flange and forming the beveled edge E on the flange of the cup. During this movement, the upper die member is cushioned by compression of the spring 78. At the end of the operation, the air is exhausted from the two cylinders and the compressed springs 23 and 78 move the die members back to their initial positions, this movement being cushioned by the springs 22 and 76.

I claim:

1. Apparatus for molding cups of leather or the like, comprising a pair of aligned cylinders, a piston in one of the cylinders, a die support carried by the piston, a die yieldingly mounted in the support, a stationary die supported from the other cylinder in alignment with the movable die, a piston in the second cylinder, a die support carried thereby, a cylindrical die surrounding the stationary die and carried by the die support, pipes to deliver fluid under pressure to the cylinders and valves arranged in each of the pipes.

2. Apparatus for molding cups of leather or the like, comprising a yieldingly supported lower die, an upper die in alignment with the lower die, a cylindrical die surrounding the upper die, a pair of aligned cylinders, pistons in the cylinders, one of the pistons being connected to one of the first two mentioned dies and one to the cylindrical die, pipes to deliver fluid under pressure to the cylinders, and valves arranged in each of the pipes.

3. Apparatus for molding cups of leather or the like, comprising a pair of aligned cylinders, a piston in one of the cylinders, a die support carried by the piston, a die yieldingly mounted in the support, a stationary die rigidly mounted in the second cylinder, a piston in the second cylinder surrounding the stationary die, a die support carried thereby, a cylindrical die surrounding the stationary die and carried by the die support, a pipe connected to each of the cylinders to deliver fluid under pressure thereto, and a valve arranged in each of the pipes.

4. Apparatus for molding cups of leather or the like comprising a pair of aligned cylinders, a piston in one of the cylinders, a die support carried by the piston, a die yieldingly mounted in the support, a stationary die rigidly mounted in the second cylinder, a piston in the second cylinder surrounding the stationary die, a die support carried thereby, a cylindrical die surrounding the stationary die and carried by the die support, a pipe connected to each of the cylinders to deliver fluid under pressure thereto, a valve arranged in each of the pipes, guide rods carried by the die supports, and guides carried by the cylinders through which the guide rods pass.

5. Apparatus for molding cups of leather or the like comprising a pair of aligned cylinders, a piston in one of the cylinders, a die support carried by the piston, a die yieldingly mounted in the support, a stationary die rigidly mounted in the second cylinder, a piston in the second cylinder surrounding the stationary die, a die support carried thereby, a cylindrical die surrounding the stationary die and carried by the die support, a pipe connected to each of the cylinders to deliver fluid under pressure thereto, a valve arranged in each of the pipes, guide rods carried by the die supports, guides carried by the cylinders through which the guide rods pass, springs mounted on the guide rods and adapted to be placed under compression when the pistons move upwardly in the cylinders to return the pistons and movable dies to their original positions when the fluid pressure is released.

CHARLES J. COPPOLA.

REFERENCES CITED

The following references are of record in the file of this patent:

UNITED STATES PATENTS

| Number | Name | Date |
| --- | --- | --- |
| 1,491,687 | Flagg | Apr. 22, 1924 |
| 1,667,673 | Pierson et al. | Apr. 24, 1928 |